United States Patent [19]

Graham et al.

[11] 4,180,388
[45] Dec. 25, 1979

[54] PROCESSES

[75] Inventors: Tommy E. Graham; Donald L. MacLean, both of Raleigh, N.C.

[73] Assignee: Monsanto Company, St. Louis, Mo.

[21] Appl. No.: 888,105

[22] Filed: Mar. 20, 1978

[51] Int. Cl.² ............................................. B01D 53/22
[52] U.S. Cl. ............................................ 55/16; 55/158
[58] Field of Search ................. 55/16, 158; 210/23 H, 210/257 M, 321 R, 321 A

[56] References Cited

U.S. PATENT DOCUMENTS

| | | | |
|---|---|---|---|
| 2,617,493 | 11/1952 | Jones | 55/16 |
| 3,339,341 | 9/1967 | Maxwell et al. | 55/16 |
| 3,350,844 | 11/1967 | Robb | 55/16 |
| 3,713,271 | 1/1973 | Franz et al. | 55/16 |
| 3,836,457 | 9/1974 | Gross et al. | 210/23 H |
| 4,000,065 | 12/1976 | Ladha et al. | 210/321 R X |

FOREIGN PATENT DOCUMENTS 2652432  5/1977  Fed. Rep. of Germany ............. 55/16

OTHER PUBLICATIONS

Hwang et al., *Operating Lines in Cascade Separation of Binary Mixtures*, The Canadian Journal of Chem. Eng., Feb. 1965, pp. 36–39.

*Primary Examiner*—Robert H. Spitzer
*Attorney, Agent, or Firm*—Norman L. Balmer; Howard C. Stanley; James W. Williams, Jr.

[57] ABSTRACT

Processes are disclosed for separating at least one gas from a gaseous feed mixture containing at least one other gas comprising passing the gaseous feed mixture to at least two permeator stages in series. Each permeator stage contains a separation membrane which has a feed side and a permeate exit side and exhibits selective permeation of the at least one gas as compared to the permeation of the at least one other gas of the gaseous mixture. A total pressure differential is maintained across the thickness of the separation membrane in each permeator stage to provide a driving force for the permeation of the at least one gas across the separation membrane. The ratio of total pressure on the feed side to total pressure on the permeate exit side of the separation membrane for at least one permeator stage is less than the ratio of total pressure on the feed side to total pressure on the permeate exit side of the separation membrane for at least one subsequent, i.e., downstream, permeator stage. The at least one gas of the gaseous feed mixture permeates through the membrane, and a permeating gas containing the at least one gas is obtained on the permeate exit side of each of the permeator stages. Between permeator stages, the non-permeating gas from one permeator stage is passed to the feed side of the next permeator stage.

17 Claims, 1 Drawing Figure

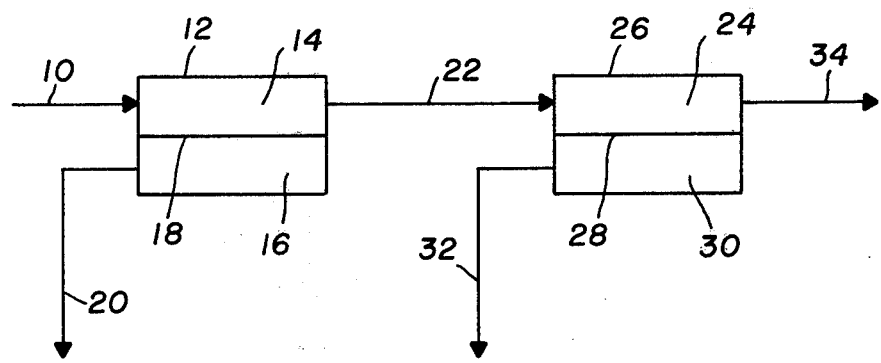

PROCESSES

This invention relates to processes for separating at least one gas from a gaseous feed mixture containing at least one other gas by selective permeation through a separation membrane.

The need to separate at least one gas from a gaseous mixture is often encountered in modern society. For instance, the removal of contaminants in waste gas streams may be required from an environmental standpoint, and if the contaminants are useful, the removal and recovery of the contaminants may be economically desirable. Moreover, the recovery of one or more gases from a gaseous mixture may be a necessary procedure in chemical processing operations. Accordingly, many procedures have been developed to effect gas separations such as selective condensation, adsorption-desorption, absorption-desorption, and the like. One of the more recent proposals to effect gas separations is by selective permeation through semi-permeable membranes, i.e., separation membranes.

According to current theories, gas separations effected by separation membranes may be by several mechanisms. One group of such mechanisms include Knudsen flow, or diffusion, and the like which involve the passage of gases through pores (i.e., continuous flow channels for gas flow in communication with both the feed and exit surfaces of the membrane) in the separation membrane. In another postulated mechanism for gas separations, the passage of a gas through the membrane may be by interaction with the material of the membrane. In order to effect the permeation of a gas through a separation membrane, a driving force must be provided. Generally, this driving force is provided by maintaining a total pressure differential across the thickness of the separation membrane. Hence, the permeate exit side of the separation membrane is often at a substantially lower pressure than the feed side of the separation membrane. The use of substantial total pressure differentials is especially prevalent in connection with gas separation operations in which the permeation is by interaction with the material of the separation membrane in order to provide economically attractive fluxes of the permeating gas per unit of available membrane surface area.

If, for instance, the permeating gas is to be discharged to the environment or utilized at low pressure, e.g., as a burner feed, the use of a substantial total pressure differential across the separation membrane may be wholly acceptable. However, it is often desired to employ the permeating gas in a chemical process operating at superatmospheric pressure. For example, the gaseous feed mixture to a separation membrane may be an off-stream, e.g., a purge stream, from a superatmospheric synthesis process using a cyclic reaction loop such as an ammonia or methanol synthesis process. At least one of the unreacted reactants in the off-stream may be recovered by permeation through a separation membrane and returned to the superatmospheric synthesis process to enhance conversion yields of the process. Thus, compression costs are incurred in returning the permeating gas to the synthesis process. These compression costs may off-set any savings which may have been realized due to the recovery and returning to the synthesis process of the permeating gas.

By this invention processes are provided for separating at least one gas from a gaseous feed mixture containing at least one other gas by selective permeation through a separation membrane in which processes desirable amounts of permeating gas can be obtained while requiring a reduced amount of compression to provide the permeating gas at advantageous elevated pressures. In accordance with the processes of this invention a gaseous feed mixture is passed to at least two permeator stages in series. Each of the permeator stages contain a separation membrane having a feed side and a permeate exit side and exhibiting selectivity to the permeability of the at least one gas as compared to the permeability of the at least one other gas. A total pressure differential is maintained across the separation membrane to provide the driving force to effect the desired permeation of the at least one gas. Between permeator stages, the non-permeating gas from the feed side of the separation membrane of one permeator stage is passed to the feed side of the separation membrane of the next permeator stage. The ratio of total pressure on the feed side to total pressure on the permeate exit side of the separation membrane for at least one permeator stage (hereinafter low total pressure ratio permeator stage) is less than the ratio of total pressure on the feed side to total pressure on the permeate exit side of the separation membrane for at least one subsequent, i.e., downstream, permeator stage (hereinafter high total pressure ratio permeator stage).

The at least two permeator stages of this invention provide significant advantages in that at least one low total pressure ratio permeator stage separates the at least one gas from the gaseous feed mixture while enabling the permeating gas from that stage to be at a desirable total pressure which may require little, if any, recompression for use in a chemical process. The non-permeating gas from the at least one low total pressure ratio permeator stage is passed to at least one high total pressure ratio permeator stage in which additional amounts of the at least one gas are separated. Although the permeating gas from this permeator stage may be at a lower total pressure than that of the permeating gas from the at least one low total pressure ratio permeator stage, the weight amount of permeating gas which requires additional recompression is only a portion of the permeating gases from all of the permeator stages. Thus, less recompression is required than if all of the permeating gases were at the lower total pressure. By the use of the process of this invention, it is possible to enhance recovery of the at least one gas of the gaseous mixture without unduly increasing permeating gas recompression costs. Moreover, the total available separating membrane area for a given recovery of the at least one gas is reduced using the processes of this invention in comparison to the total available membrane area required for the given recovery of the at least one gas if only low total pressure ratio permeators in parallel flow relationship were employed.

According to current theory, the rate at which a moiety permeates through a separation membrane is dependent in part on the driving force for that moiety. With respect to membrane separations in which the moiety is gaseous and passes from a feed gas mixture to a permeating gas on the exit side of the membrane, the driving force is the differential in fugacity for that moiety. Generally, fugacities for ideal gases are approximated by partial pressures and thus, conventionally, in gas separations, the driving force is referred to in terms of partial pressure differentials. The partial pressure of a moiety in a gas mixture can be defined as the concentration of the moiety in the gas mixture on a molecular basis times the total pressure of the gas mixture. Often, the concentration of the moiety on a molecular basis is approximated by the volume concentration of the moiety. In view of the effect of the concentration of the moiety in the gas and the total pressure of the gas on the partial pressure, these parameters can be varied jointly or separately to provide suitable partial pressure differentials across the membrane to provide desirable fluxes of the moiety. For instance, with the moiety concentrations on the feed side and on the permeate exit side and the total pressure differential across the membrane remaining constant, but varying the total pressures on the feed and permeate exit sides, a greater partial pressure differential of the moiety is provided at lower total pressures on the feed side and permeate exit side of the membrane.

Thus, in accordance with this invention, the at least one low total pressure ratio permeator stage can be operated such that a suitable partial pressure differential for the at least one gas is maintained across the separation membrane to provide, for instance, a permeating gas containing up to about 70 percent of the at least one gas in the gaseous feed mixture wherein the permeating gas is at a desirable total pressure for being used in a chemical process without requiring undue recompression. In certain instances, it may be desirable to compress the gaseous feed mixture such that the permeating gas from this permeator stage is at a total pressure suitable for direct reintroduction into the chemical process. In such instances, the gaseous feed stream may often be compressed to at least about 20 atmospheres above, say, about 25 to 100 atmospheres above, the original pressure of the gaseous feed stream.

It is clear that the non-permeating gas from the low total pressure ratio permeator stage will contain substantial amounts of the at least one gas, for instance, at least about 20 percent of the at least one gas in the gaseous feed mixture. While additional amounts of the at least one gas can often be recovered in the low total pressure ratio permeator stage, e.g., by increasing the available separation membrane area, it is preferred that this permeator stage not be operated to maximize its recovery of the at least one gas. Rather, this permeator stage is preferably operated predominantly on a flux-limiting basis. In a flux-limiting basis operation, the separation is conducted under conditions such that when the flux of the at least one gas through the membrane significantly decreases, the separation operation is terminated, e.g., by passing the non-permeating gas from the permeator. Flux-limiting basis operations are in contrast to unwanted permeate-limiting basis operations. In unwanted permeate-limiting basis operations, the separation is continued to provide a suitable recovery of a high proportion of the moiety from the feed mixture without undue permeation of the undesired moieties in the feed mixture. Generally, in any commercially practical membrane separation operation, both flux-limiting basis and unwanted permeate-limiting basis considerations will be involved. Often, in a predominantly flux-limiting mode of operation, it is desired that the percent of the difference in partial pressures of the at least one gas (A) between the gaseous feed mixture (ppA feed) and the non-permeating gas (ppA non-permeating) divided by the difference between the partial pressure of the at least one gas in the gaseous feed mixture and the minimum partial pressure of the at least one gas on the permeate exit side of the membrane (ppA permeate min.) is up to about 90, say, about 20 or 30 to 90, often about 30 to 85. On the other hand, in a predominantly unwanted permeate-limiting basis mode of operation, this relationship will often be at least about 85 or 90 percent.

As stated above, the low total pressure ratio permeator stage is preferably operated on a predominantly flux-limiting basis in order to provide a permeating gas at a desirable total pressure. For a given total pressure differential across the separation membrane and a given separation membrane, a high purge stream flow rate per unit of available membrane surface area can be employed and a greater amount of the at least one gas permeates the membrane per unit area per unit time than if the permeator stage were operated on an unwanted permeate-limiting basis. Generally, sufficient membrane area is provided in the low total pressure ratio permeator stages to permeate at least about 20, preferably about 30 to 70, percent of the at least one gas in the gaseous feed mixture.

Since the low total pressure ratio permeator stages are preferably flux limited, particularly desirable separation membranes exhibit high permeabilities for the permeation of the at least one gas, but need not exhibit as high a selectivity to the permeability of the at least one gas as compared to the permeability of the at least one other gas in the gaseous mixture as the selectivity required of a membrane in a predominantly unwanted permeate-limited mode of operation or if the separation were conducted in a single permeator stage to provide the same overall recovery of the at least one gas.

The non-permeating gas from the at least one low total pressure ratio permeator stage is passed to the feed side of at least one high total pressure ratio permeator stage to recover additional amounts of the at least one gas. The amount of the at least one gas in the permeating gas from this permeator stage is frequently at least about 10, say, at least about 15 percent of the amount of the at least one gas in the gaseous feed mixture. The amount of the at least one gas in the total permeating gas from all of the permeator stages is preferably at least about 50, e.g., at least about 60, say, about 60 to 95, percent of the at least one gas in the gaseous feed mixture.

The at least one high total pressure ratio permeator stage can be operated on a predominantly flux-limited basis or a predominantly unwanted permeate-limited basis.

The gas fed to the high total pressure ratio permeator stage can be at any suitable total pressure. For instance, the non-permeating gas from the low total pressure ratio permeator stage can be compressed or decompressed, or can remain at substantially the same pressure depending upon the desired total pressure differential across the separation membrane, the total pressure of the permeating gas, and the like. Often, due to strengths obtainable in some suitable separation membranes, the total pressure of the gas fed to the high total pressure ratio permeator stage is decompressed to enable achieving a desirable total pressure differential across the membrane.

The ratio of the total pressure on the feed side to the total pressure on the permeate exit side of the at least one low total pressure ratio permeator stage is less than that ratio for the at least one high total pressure ratio permeator stage. Often, the total pressure ratio of at least one low total pressure ratio permeator stage is at least about 10 or 15, say, about 15 to 99, preferably, about 20 to 95, percent less than the total pressure ratio of at least one high total pressure ratio permeator stage. Generally the total pressure drop across at least one high total pressure ratio permeator stage is within about 10 to 500, say, about 15 to 250, percent of the total pressure drop across at least one low total pressure ratio permeator stage. In one aspect of this invention, the total pressure on the permeate exit side of the higher total pressure ratio permeator stage is at a lower total pressure than the total pressure on the permeate exit side of the lower total pressure ratio permeator stage.

Any suitable number of permeator stages may be employed so long as at least one low total pressure ratio permeator stage and at least one high total pressure ratio permeator stage are provided. Each permeator stage may be comprised of one or more separate permeators wherein plural permeators are arranged in substantially parallel flow relationships. Preferably, the first permeator stage is a low total pressure ratio permeator stage. Often, the last permeator stage is a high total pressure ratio permeator stage. Most frequently, two permeator stages are utilized; however, in some instances three or more permeator stages may be desirable. Generally, little benefit is achieved in the use of permeator stages above about five. Preferably, if any permeator stage is operated on a predominantly unwanted permeate-limiting basis, that permeator stage is the last permeator stage.

The effective membrane surface area (i.e., the membrane area available to effect separation) for each permeator stage should be sufficient to allow a desired amount of the at least one gas to permeate. The amount of effective membrane surface area to be employed is influenced by, for instance, the permeation rate of the at least one gas through the membrane under the separation conditions, i.e., temperature, absolute pressure, total pressure differential across the membrane, and partial pressure differentials of the at least one gas across the membrane. Advantageous total pressure differentials across separation membranes are at least about 10, say, at least about 20, atmospheres, and may be up to 100 or 200 atmospheres or more. However, the pressure differential should not be so great as to unduly stress the membranes such that it ruptures or is prone to easily rupturing.

A permeator containing the separation membrane may be of any suitable design for gas separations, e.g., plate and frame, or having spiral wound film membranes, tubular membranes, hollow fiber membranes, or the like. Preferably, the permeator comprises hollow fiber membranes due to the high membrane surface area per unit volume which can be obtained. When the membranes are in tubular or hollow fiber form, a plurality of the membranes can be substantially parallelly arranged in bundle form and the gaseous feed mixture can be contacted with either the outside (shell side) or the inside (bore side) of the membranes. Preferably, the gaseous feed mixture is contacted with the shell side of the membranes since passage of the gaseous feed mixture through the bore side of the membranes may involve substantially greater pressure losses. With shell side feed, the shell side effluent from the permeator can often be at less than about 1 or 5, often within less than about 0.5, atmospheres below the pressure of the gaseous feed mixture fed to the permeator and thus be at an advantageous pressure for subsequent processing or energy recovery, e.g., by the use of turbines. Since the concentration of the at least one gas on the feed side of the membrane is continually diminishing as the at least one gas permeates to the permeate exit side of the membrane which has increasing concentration of the at least one gas, the partial pressure differential of the at least one gas across the membrane is continually changing. Therefore, flow patterns in the permeator can be utilized to provide desirable recoveries of the at least one gas from the gaseous feed mixture. For instance, the flows of the gaseous feed mixture and the permeating gas can be concurrent or countercurrent. With bundles of hollow fiber and tubular membranes, the shell side feed can be radial, i.e., the feed stream transversely flows past the membranes either to the inside or, usually the outside of the bundle, or the flow can be axial, i.e., the feed stream disperses within the bundle and generally flows in the direction in which the hollow fibers or tubular membranes are oriented.

Any suitable material may be employed for the separation membrane as is well-known in the art. Typical membrane materials include organic polymers or organic polymer mixed with inorganics, e.g., fillers, reinforcements, and the like. Metallic and metal-containing membranes may also be used.

The drawing is a schematic representation for purposes of illustration of two permeator stages employed in accordance with this invention.

With reference to the drawing, a gaseous feed mixture passes via line 10 to first permeator stage 12. First permeator stage 12 is separated into two compartments, i.e., feed compartment 14 and permeate compartment 16, by separation membrane 18. The permeating gas is withdrawn from permeate compartment 16 via line 20. First permeator stage 12 is operated as a low total pressure ratio permeator stage. The non-permeating gas from the feed side of separation membrane 18 in first permeator 12 is withdrawn from feed compartment 14 through line 22 and is passed to feed compartment 24 of second permeator stage 26. The second permeator stage comprises separation membrane 28 which separates feed compartment 24 from permeate compartment 30. The permeating gas is withdrawn from permeate compartment 30 via line 32. The non-permeating gas from feed compartment 24 is passed from second permeator stage 26 through line 34. The second permeator stage is operated as a high total pressure ratio permeator stage.

The following example is provided in illustration of a process in accordance with this invention. All parts and percentages are by volume unless otherwise noted.

A purge stream from an ammonia synthesis plant in an amount of about 6400 kilograms per hour is passed to the first permeator which consists of 25 hollow fiber membrane-containing, shell-side axially fed, countercurrent, permeators in parallel. The purge stream is at a temperature of about 30° C. and comprises about 65 volume percent hydrogen, 22 volume percent nitrogen, 4.5 volume percent argon, and 8.5 volume percent methane. Each permeator contains about 93 square meters of effective surface area. The membranes are comprised of anisotropic polysulfone substantially prepared in accordance with the method disclosed in Example 64 of the Henis, et al, U.S. patent application Ser. No. 832,481, filed Sept. 13, 1977, except that the spinning solution contains about 30 weight percent solids; the spinning jet dimensions are about 458 microns outside diameter, 127 microns inside diameter, and 76 microns diameter injection bore; the injection fluid is a mixture of 60 volume percent dimethylacetamide in water. The last godet bath is at a temperature of about 50° C.; and the fibers are washed for 24 hours with no subsequent storage in water. Appropriate polymer solution and injection fluid rates are employed such that the dimensions of the hollow fibers are about 450 microns outside diameter and about 120 microns inside diameter. The permeator exhibits a separation factor of hydrogen over methane of about 30 and a permeability of about $50 \times 10^{-6}$ cubic centimeters of hydrogen per square centimeter of surface area per second per centimeter of mercury pressure drop. A pressure drop of about 65 atmospheres is maintained across the membrane, and approximately 1100 kilograms per hour of a first permeating gas is obtained from the bore side of the first permeator stage at a pressure of about 70 atmospheres absolute. The first permeating gas comprises 90.3 volume percent hydrogen, 6.2 volume percent nitrogen, 2.4 volume percent methane, and 1.2 volume percent argon.

The non-permeating gas from the first permeator stage is at a pressure of about 136 atmospheres absolute and contains about 43.8 volume percent hydrogen, 35.4 volume percent nitrogen, 13.7 volume percent methane, and 7.1 volume percent argon. This non-permeating gas enters the second permeator stage comprising 7 permeators (as described above) in parallel. About 496 kilograms per hour of a second permeating gas is obtained from the bore side of the second permeator stage which is at a pressure of about 30 atmospheres absolute and comprises 88 volume percent hydrogen, 7.4 volume percent nitrogen, 1.5 volume percent argon, and 2.4 volume percent methane. The non-permeating gas from the second permeator stage is at a pressure of about 136 atmospheres absolute and contains about 24.2 volume percent hydrogen, 47.7 volume percent nitrogen, 18.5 volume percent methane, and 9.6 volume percent argon. About 86.3 percent of the hydrogen in the purge stream is recycled to the ammonia synthesis reaction zone.

It is claimed:

1. A process for separating at least one gas from a gaseous feed mixture containing at least one other gas comprising passing the gaseous feed mixture to at least two permeator stages in series, each permeator stage comprising a separation membrane exhibiting selectivity to the permeability of said at least one gas as compared to the permeability of said at least one other gas in the gaseous feed mixture and having a feed side and a permeate exit side in which the permeate exit side is at a lower total pressure than the total pressure on the feed side, wherein between permeator stages, the non-permeating gas from the feed side of one permeator stage is passed to the feed side of the next permeator stage; and wherein at least one permeator stage has a lower ratio of total pressure on the feed side to total pressure on the permeate exit side than the ratio of total pressure on the feed side to total pressure on the permeate exit side of at least one subsequent permeator stage, and the total pressure on said permeate exit side of said at least one subsequent permeator stage is lower than the total pressure on said permeate exit side of said at least one permeator stage.

2. The process of claim 1 wherein the total pressure differential across the at least one permeator stage having a low ratio of total pressure on the feed side to total pressure on the permeate exit side is at least about 20 atmospheres.

3. The process of claim 1 wherein the total pressure differential across the at least one permeator stage having a higher ratio of total pressure on the feed side to total pressure on the permeate exit side is at least about 20 atmospheres.

4. The process of claim 1 wherein the at least one permeator stage having a lower ratio of total pressure on the feed side to total pressure on the permeate exit side is operated predominantly on a flux-limiting basis.

5. The process of claim 4 wherein the percent of difference in partial pressures of said at least one gas between the gaseous feed mixture passed to said lower ratio of total pressure permeator stage and the non-permeating gas from said permeator stage divided by the difference between the partial pressure of said at least one gas in the gaseous feed mixture passed to said permeator stage and the minimum partial pressure of said at least one gas on the permeate exit side of said permeator stage is about 20 to 90.

6. The process of claim 1 or 5 wherein at least about 20 percent of the at least one gas in the gaseous feed mixture permeates to the permeate exit side of the at least one permeator stage having a lower ratio of total pressure on the feed side to total pressure on the permeate exit side.

7. The process of claim 1 or 5 wherein the last permeator stage is said permeator stage having a higher ratio of total pressure on the feed side to total pressure on the permeate exit side.

8. The process of claim 1 or 5 wherein the amount of said at least one gas in the permeating gas from the at least one permeator stage having a higher ratio of total pressure on the feed side to total pressure on the permeate exit side is at least about 10 percent of the at least one gas in the gaseous feed mixture.

9. The process of claim 1 or 5 wherein the ratio of the total pressure on the feed side to total pressure on the permeate exit side across the at least one permeator stage having a lower ratio of total pressure on the feed side to total pressure on the permeate exit side is at least about 10 percent less than that ratio across the at least one permeator stage having a higher ratio of total pressure on the feed side to total pressure on the permeate exit side.

10. A process for separating at least one gas from a gaseous feed mixture containing at least one other gas comprising passing the gaseous feed mixture to at least two permeator stages in series, each permeator stage comprising a separation membrane exhibiting selectivity to the permeability of said at least one gas as compared to the permeability of said at least one other gas in the gaseous feed mixture and having a feed side and a permeate exit side in which the permeate exit side is at a lower total pressure than the total pressure on the feed side, wherein between permeator stages, the non-permeating gas from the feed side of one permeator stage is passed to the feed side of the next permeator stage; wherein at least one permeator stage has a lower ratio of total pressure on the feed side to total pressure on the permeate exit side than the ratio of total pressure on the feed side to total pressure on the permeate exit side of at least one subsequent permeator stage, and wherein said at least one permeator stage having a lower ratio of total pressure on the feed side to total pressure on the permeate exit side is operated predominantly on a flux-limiting basis.

11. The process of claim 10 wherein the percent of difference in partial pressures of said at least one gas between the gaseous feed mixture passed to said lower ratio of total pressure permeator stage and the non-permeating gas from said permeator stage divided by the difference between the partial pressure of said at least one gas in the gaseous feed mixture passed to said permeator stage and the minimum partial pressure of said at least one gas on the permeate exit side of said permeator stage is about 20 to 90.

12. The process of claim 11 wherein the total pressure differential across the at least one permeator stage having a low ratio of total pressure on the feed side to total pressure on the permeate exit side is at least about 20 atmospheres.

13. The process of claim 11 or 12 wherein the total pressure differential across the at least one permeator stage having a higher ratio of total pressure on the feed side to total pressure on the permeate exit side is at least about 20 atmospheres.

14. The process of claim 11 wherein at least about 20 percent of the at least one gas in the gaseous feed mixture permeates to the permeate exit side of the at least one permeator stage having a lower ratio of total pressure on the feed side to total pressure on the permeate exit side.

15. The process of claim 11 or 14 wherein the amount of said at least one gas in the permeating gas from the at least one permeator stage having a higher ratio of total pressure on the feed side to total pressure on the permeate exit side is at least about 10 percent of the at least one gas in the gaseous feed mixture.

16. The process of claim 11 or 14 wherein the ratio of the total pressure on the feed side to total pressure on the permeate exit side across the at least one permeator stage having a lower ratio of total pressure on the feed side to total pressure on the permeate exit side is at least about 10 percent less than that ratio across the at least one permeator stage having a higher ratio of total pressure on the feed side to total pressure on the permeate exit side.

17. The process of claim 1 or 11 wherein the total pressure on the feed side of the permeator stage having the higher ratio of total pressure on the feed side to total pressure on the permeate exit side, is up to substantially the same total pressure as the total pressure on the feed side of the permeate stage having the lower ratio of total pressure on the feed side to total pressure on the permeate exit side.

* * * * *